United States Patent [19]
Winterhoff et al.

[11] Patent Number: 5,638,482
[45] Date of Patent: Jun. 10, 1997

[54] INTERCEPT MECHANISM FOR OPTICAL CABLES

[75] Inventors: Hans Winterhoff, Schwerte; Andreas Guenther; Thorsten Mueller, both of Menden; Rainer Zimmer, Schalksmuehle, all of Germany

[73] Assignee: RXS Schrumpftechnik-Garnituren GmbH, Hagen, Germany

[21] Appl. No.: 500,588

[22] Filed: Jul. 11, 1995

[30] Foreign Application Priority Data

Jul. 21, 1994 [DE] Germany ................ 44 25 925.5

[51] Int. Cl.⁶ ................................................. G02B 6/00
[52] U.S. Cl. ................................. 385/136; 385/147
[58] Field of Search .................... 385/136–139, 385/134, 135, 147

[56] References Cited

FOREIGN PATENT DOCUMENTS

| | | | |
|---|---|---|---|
| 3624514 | 1/1988 | Germany . | |
| 3726718 | 2/1989 | Germany . | |
| 3726719 | 2/1989 | Germany | 385/136 |
| 4231181 | 8/1993 | Germany . | |
| 0191303 | 8/1991 | Japan | 385/136 |

*Primary Examiner*—Phan T. H. Palmer
*Attorney, Agent, or Firm*—Hill, Steadman & Simpson

[57] ABSTRACT

An intercept mechanism for clamping on a central element includes a clamp element, a sleeve and a retainer element. The clamp element, at one end, has a mounting end connected by an adapter portion to a clamping end which has been bent in a U-shape to receive the end of the central element and is held on the central element by the sleeve. The mounting end can be detachably connected to the retainer element and the retainer element and mounting end can then be fixed to the cable with the assistance of a hose clamp.

9 Claims, 3 Drawing Sheets

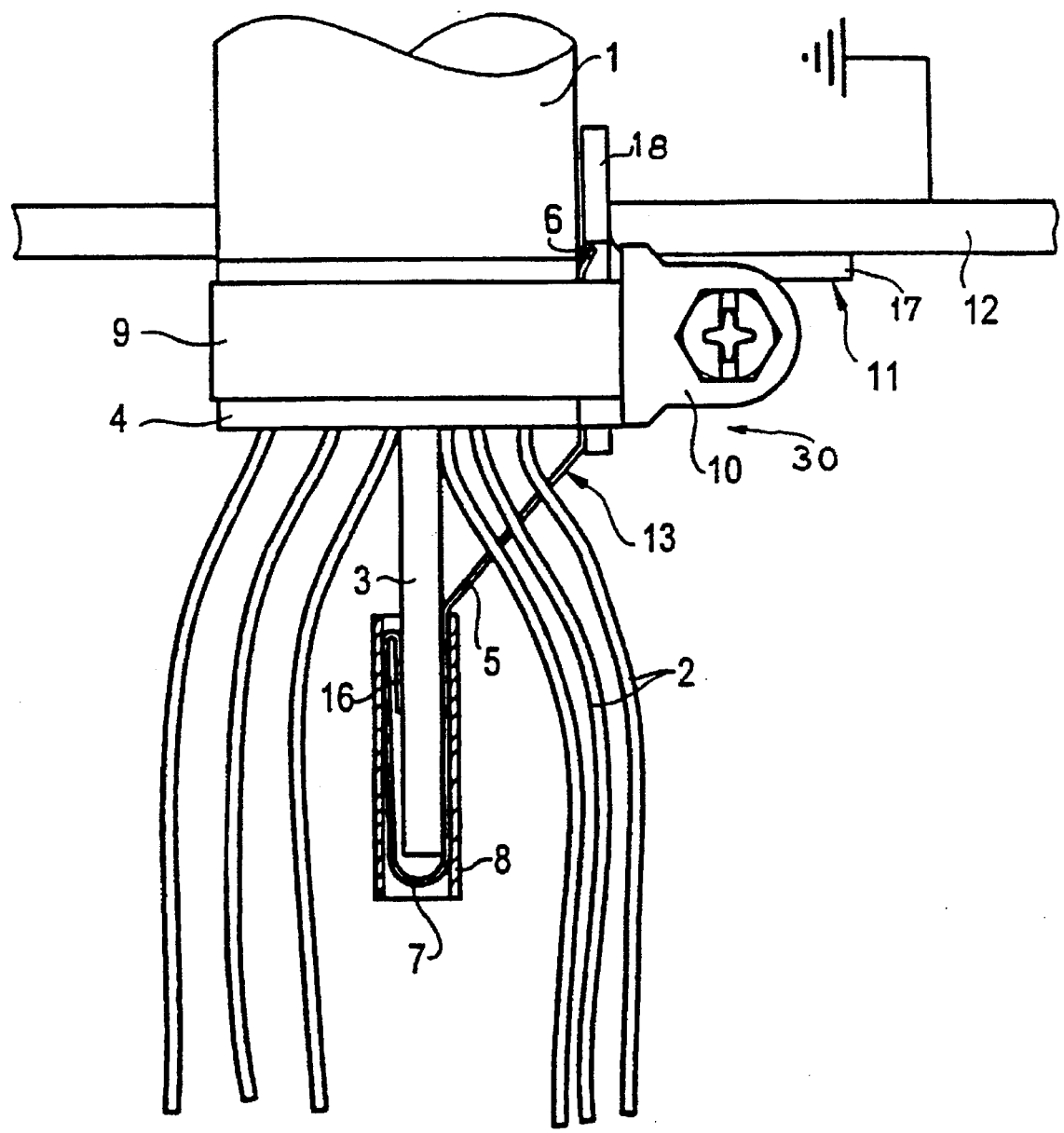

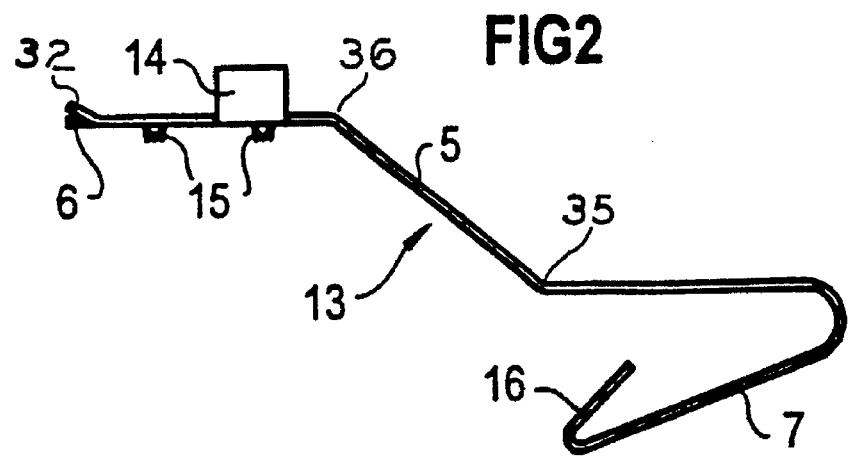
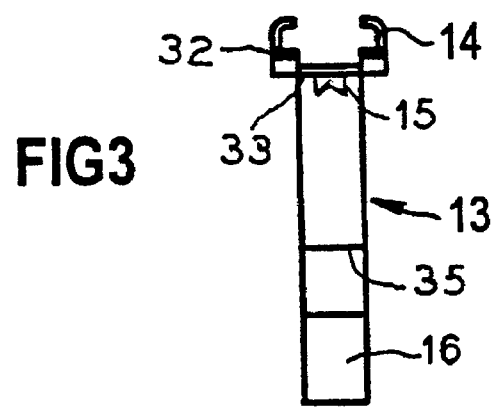
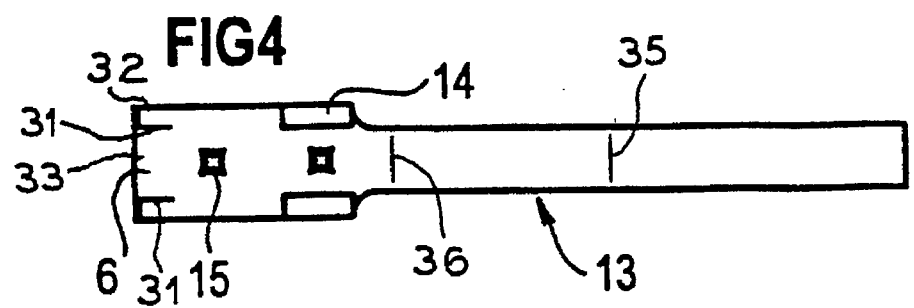

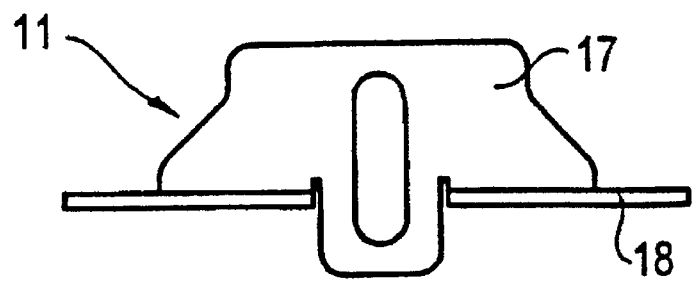
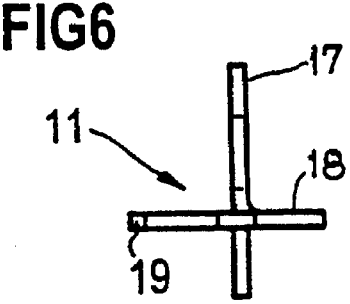
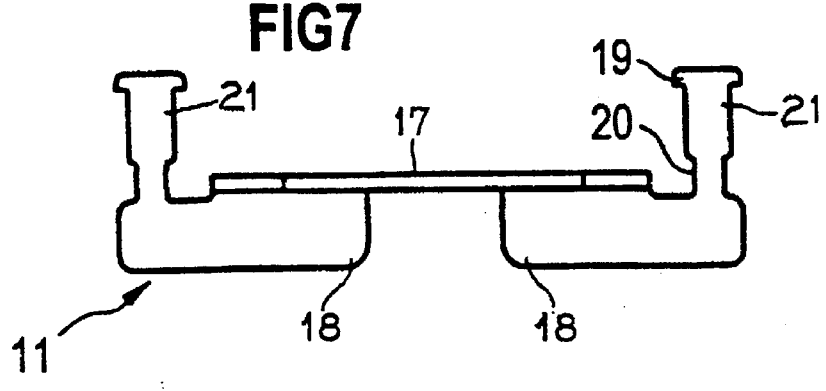

1

INTERCEPT MECHANISM FOR OPTICAL CABLES

BACKGROUND OF THE INVENTION

The present invention is directed to an intercept mechanism having a clamp element for the attachment of a mechanical connection for a tensile central element of an optical cable.

German Published Application 37 26 718 discloses a mechanism for forming a clamp element. The central element of the optical cable in this published application is secured against migration and is contacted with relatively cumbersome screw clamps, threaded bolts and the like. Such a structure, however, is very difficult and time-consuming to install in a cable with many hollow leads or air-space paper-insulated cores. In addition, a risk of injury is present when manipulating with tools in the center of these hollow leads to install the mechanism.

SUMMARY OF THE INVENTION

It is an object of the present invention to provide an intercept mechanism for the tensile central element of an optical cable that can be grasped and fixed simply and relatively uncomplicated between hollow leads of the cable.

To accomplish these goals, the intercept mechanism comprises a clamp element for attachment with a mechanical connection to the tensile central element of the optical cable, a sleeve and a retainer element. The clamp element is composed of a U-shaped clamp end of a member and coacts with the sleeve that is slipped onto the clamp element. The element, at an opposite end, has a mounting end connected to the clamp end through an implementation adapter. The aperture width of the clamp end corresponds to the diameter of the central element of the cable and the clamp element is grasped at the retainer element which can be fixed to the cable end with the assistance of a clamping arrangement and can also be fixed to a fastening base.

The migration of the central element out of an optical cable produced by temperature fluctuations, cable movements or the like is prevented with the intercept mechanism of the present invention. There is also the possibility that a metallic central element can be grounded with such a mechanism. An electrical as well as a mechanical connection to the central element is, thus, possible with the mechanism so that the cable shielding of the optical cable can also be additionally grasped on the basis of the shaping of the clamping element. In addition, a mechanical connection of the cable cladding with a metallic or non-metallic central element to a fastening base is enabled.

Before mounting of the intercept mechanism of the present invention, the clamp element is applied to a retainer element and engaged thereon. After this, the retainer element is loosely mounted on a fastening base in an arbitrary way. The relieved or cut edge of the optical cable is thereby placed up to the end of the retainer element. The retainer element is then aligned together with the optical cable and is fixed to the fastening base. The clamp element is now positioned between the hollow leads of the optical cable next to the central element. Subsequently, the central element is shortened with a suitable tool to a predetermined length. The clamp end is then laterally placed over the central element and a sleeve is slipped onto the clamp end to form a clamping of the central element. The optical cable is now fixed to the retainer element with the assistance of a cable binder or of a band clamp mounting or hose clamp. However, the fastening with a band clamp mounting is better suited for contacting the cable shielding than fastening with a plastic cable binder.

The advantages of the intercept mechanism of the present invention can especially be seen wherein the clamp element is extremely narrow and can be easily inserted from the outside between the hollow leads or cores of the cable. Being a round member, the sleeve for the clamping fastening and contacting of the central element of the cable also fits well between the hollow leads or cores of the cable. In addition, no tool is passed through or between the hollow leads or cores for fastening the central element so that no risk of injury to these will occur.

Other advantages and features of the invention will be readily apparent from the following description of the preferred embodiments, the drawings and claims.

BRIEF DESCRIPTION OF THE DRAWINGS

FIG. 1 is a side view of the completely-assembled intercept mechanism of the present invention mounted on the cable with portions broken away for purposes of illustration;

FIG. 2 is a side view of the clamp element of the intercept mechanism;

FIG. 3 is an end view of the clamp element of FIG. 2;

FIG. 4 is a plan view of the clamp element of FIG. 2;

FIG. 5 is a front view of a retainer element for the intercept mechanism;

FIG. 6 is a side view of the retainer element of FIG. 5; and

FIG. 7 is a plan view of the retainer element of FIG. 5.

DESCRIPTION OF THE PREFERRED EMBODIMENTS

The principles of the present invention are particularly useful when incorporated in an intercept mechanism, generally indicated at 30 in FIG. 1. The intercept mechanism 30 is illustrated as being attached to a central element 3 of an optical cable 1 which has a plurality of leads 2 which surround the central element 3. The intercept mechanism 30 includes a clamp element 13, a clamp sleeve 8 and a retaining or retainer element, generally indicated at 11. As illustrated, the end of the central element 3 is introduced into a clamp end 7 of the clamp element 13 in a clamping fashion. An end 16 of a free leg of the clamp end 7 is bent with a return bend facing inward in order to improve the introduction. The clamp sleeve 8 is slipped onto the clamp end 7, and coacts with the end 7 to clamp the central element 3. The clamp end 7 is conducted out from the center of the cable toward the outside via an implementation or adapter portion 5 and has a mounting end 6 fixed to the retainer element 11. The retainer element 11 is now fixed to the offset cable end 4 by a cable clip 9 and a turnbuckle 10. In addition, the retainer element 11 is also attached to a fastening base 12, which extend along the side of the cable 1, for example, with screws or by clamping. When the fastening base 12 is composed of conductive material, a grounded potential can be connected at the same time, as illustrated.

The clamp element 13, as best illustrated in FIGS. 2–4, is composed of the clamp end 7 with its bent-in or reverse-bend portion 16 at an outer end, the adapter 5 and the fixing head or mounting end 6. The clamp end 7 is bent U-shaped, being first angularly-opened, and is slipped in clamping fashion onto the central element of the cable with the assistance of the sleeve to be slipped on thereafter. As a result of the bent-in portion 16 on the end of a leg of the U-shaped bend, a matching to different central element diameters is assured to produce a frictional connection between the clamp element 13 and the central element after the sleeve 8 has been slipped over the end 7. The angular arrangement for the implementation adapter 5 serves the purpose of conducting the clamp end out of the center of the cable toward the outside region of the cable and can be more or less bent out by adjusting the angle of bending at bend lines 35 and 36 and, thus, adapted to correspond to the thickness or diameter of the cable. A mounting or fixing end 6 is fashioned with a catch nose 32 that assures a latching connection to the retainer element 11. In addition, the mounting end 6 is provided with contact claws 15 that engage into the cable shielding of the cable and, thus, assure a reliable contact, as well as an enhanced grip. The retainer element is inserted into U-shaped guides 14 which are provided on the mounting end 6 and the element is held from twisting by these guides. Due to the engagement of the mounting ends 6, slippage is no longer possible, given the occurrence of tensile or pulling forces.

The guides 14 are best illustrated in FIGS. 3 and 4. As best illustrated in FIG. 4, the mounting end 6 terminates in a pair of slits 31, 31 to form the catch noses 32, which can be bent up from a central portion 33. These catch noses 32 coact with the guides 14 to form a latching connection on the retaining element 11. As illustrated in FIG. 2, the implementation or adapter portion 5 extends between bend lines 35 and 36, and the amount of bend will determine the amount of offset between the clamp end 7 and the mounting end 6.

As best illustrated in FIGS. 5, 6 and 7, the retainer 11 is composed of a seating surface 17 and a pair of fastening surfaces 18 for the clamp elements 13. The retaining element 11 is secured to a fastening base 12 with the seating surface 17, so that occurring forces and movement can be intercepted via this connection.

As shown in FIGS. 6 and 7, the fastening surfaces 18 are offset from the center of the seating surface 17 and have portions 21 terminating in limit detents 19. The fastening surface is secured to a cable which is offset from the seating surface 17 and is secured by means of a cable binding or cable clamp fitting. After securing, the central element 3 is introduced into the clamp ends 7 of the clamp element 13 and is fixed with the sleeve 8. Each of the offset portions 21 has a neck portion or introduction location 20 for enabling the U-shaped guides 14 of the clamp element to be assembled thereon. Thus, the clamp element 13 is put in place on the fastening surface 18 with the U-shaped guides 14 at the introduction location 20 and is then displaced in the direction of the limit detent 19 so that the U-shaped guides 14 of the clamp element lie against the limit detents 19 of the retainer element 11. Thus, the ends 6 have the tabs or noses 32 engaging the side of the portion to provide a spring action and, thus, assure a reliable fixing of the clamp element 13 on the retainer 11.

Although various minor modifications may be suggested by those versed in the art, it should be understood that we wish to embody within the scope of the patent granted hereon all such modifications as reasonably and properly come within the scope of our contribution to the art.

We claim:

1. An intercept mechanism for forming a mechanical connection on a tensile central element of an optical cable, said mechanism comprising a clamp element, a sleeve and a retainer element, said clamp element being formed with a U-shaped clamp end, connected by an adapter portion to a mounting end, said clamp end having an aperture width corresponding to the diameter of the central element of the cable and being received on the end of the central element and held thereon by said sleeve, the retainer element being fixed to the cable end by a cable clip and a turnbuckle, said retainer element having a portion for being secured to a fastening base, said mounting end of the clamp element being attached to said retainer element.

2. An intercept mechanism according to claim 1, wherein the mounting end can be detachably latched to the retaining element.

3. An intercept mechanism according to claim 2, which includes the mounting end having U-shaped guides for engaging a portion of the retainer element.

4. An intercept mechanism according to claim 3, wherein the mounting end terminates in contact noses coacting with said U-shaped guides to form a resilient connection with the retainer element.

5. An intercept mechanism according to claim 3, wherein the mounting end includes contact claws which engage into a cable shielding of the cable.

6. An intercept mechanism according to claim 2, wherein the clamp end, on a free leg, is provided with a reverse bent-in portion.

7. An intercept mechanism according to claim 1, wherein the retainer element is arranged on a fastening base with a screw element.

8. An intercept mechanism according to claim 7, wherein the retainer element forms a ground terminal.

9. An intercept mechanism according to claim 1, wherein a free leg of the U-shaped clamp end of the clamp element has a reversed bent-in portion to form a spring contact with the end of the central element inserted therein.

* * * * *